(12) United States Patent
Nickelsberg et al.

(10) Patent No.: US 6,381,011 B1
(45) Date of Patent: Apr. 30, 2002

(54) OPTICAL FAULT LOCATOR

(75) Inventors: Paul Nickelsberg, Lexington; Dean R. Craig, Middleboro, both of MA (US); Walter F. Kalin, Laconia; Joseph Rapoza, Merrimack, both of NH (US)

(73) Assignee: Wilcom, Inc., Laconia, NH (US)

( * ) Notice: Subject to any disclaimer, the term of this patent is extended or adjusted under 35 U.S.C. 154(b) by 0 days.

(21) Appl. No.: 09/499,107

(22) Filed: Feb. 4, 2000

Related U.S. Application Data
(60) Provisional application No. 60/120,811, filed on Feb. 19, 1999.

(51) Int. Cl.[7] .............................................. G01N 21/00
(52) U.S. Cl. ..................................................... 356/73.1
(58) Field of Search ........................ 356/73.1; 385/147; 700/12, 286, 79; 324/522, 509, 628, 107; 702/188, 59, 127, 64

(56) References Cited

U.S. PATENT DOCUMENTS

| | | | | |
|---|---|---|---|---|
| 5,285,305 A | * | 2/1994 | Cohen et al. ............... 359/110 |
| 5,307,140 A | * | 4/1994 | Lewis ........................ 356/73.1 |
| 5,365,175 A | * | 11/1994 | Patterson et al. ........... 324/501 |

* cited by examiner

*Primary Examiner*—Hoa Q. Pham
*Assistant Examiner*—Tu T. Nguyen
(74) *Attorney, Agent, or Firm*—Michael J. Persson; Lawson, Phipot & Persson, P.C.

(57) ABSTRACT

A hand held optical fault locator used to determine the distance to a discontinuity in a fiber optic cable, such as a break, nick, cut, scrape, indentation, or the like, a splice, a connector, or the end of the cable. The locator includes an analog front end, a complex programmable logic device (CPLD), a laser diode and drive, a microcontroller, at least one input, and at least one output. The preferred locator allows a user to select a specific index of refraction, to measure the distance to a fault directly in feet or meters, to measure fiber lengths at counting frequencies in the 100KHz range, to determine fiber reflection events in the digital-time domain, and to make accurate measurements without the use of a sensitivity adjustment feature.

20 Claims, 4 Drawing Sheets

OPTICAL FAULT LOCATOR

PRIORITY CLAIM

This patent claims the benefit, under 35 U.S.C. §119(b), of U.S. Provisional Patent Application Serial No. 60/ 120, 811, filed on Feb. 19, 1999.

FIELD OF THE INVENTION

The present invention relates to the field of fiber optic testing equipment and, in particular, to an optical fault locator for locating faults in fiber optic cables.

BACKGROUND OF THE INVENTION

Over the past ten years, fiber optic cables have replaced traditional telephone cables as the cable of choice for telecommunication. Although fiber optic cables have many advantages over traditional copper cables, fiber optic cables are still subject to breakage or other damage during installation or use. Accordingly, the demand for test equipment capable of detecting and locating faults in fiber optic cables has increased in recent years.

Currently, the two primary types of equipment for detecting and locating faults in fiber optic cables are optical time domain reflectometers (OTDR's) and optical fault locators. An OTDR is an optoelectronic instrument that characterizes an optical fiber by injecting a series of optical pulses into the fiber under test, extracting light that is backscattered and reflected back, measuring and integrating the intensity of the return pulses as a function of time, and plotting the integration as a function of fiber length. From this plot, the fiber's length, overall attenuation, including splice and mated-connector losses, and the location of any faults or breaks may be estimated.

Backscattered light, commonly referred to as Rayleigh scattering, is typically weak, and is due to refractive index fluctuations and inhomogeneities in the fiber core. The strength of the backscattered signal is primarily dependent upon the peak power and width of the test pulse. The backscattered signal may be used to detect faults such as micro-bends or splice losses, and to measure overall attenuation.

Reflective signals, commonly referred to as Fresnel reflections, are somewhat stronger and are caused by discontinuities in the fiber. The strength of the reflected signal is primarily dependent upon the peak power of the test pulse. Reflective signals may be used to determine the overall length of the fiber line, and to detect breaks in the fiber reflective connectors and splices of fibers having different indices of refraction.

As noted above, typical OTDR's analyze both backscattered and reflected signals and plot this analysis on a display, similar to an oscilloscope, for interpretation by a user. Although such a display allows a user to determine a broad range of information relating to the fiber optic cable, users must be skilled in the use of the OTDR in order to determine the specific location of any given fault. In addition, the cost of an OTDR typically ranges from about $7,000 to $50,000, depending upon the desired features and accuracy. This relatively high cost may be justified in applications, such as network installation and optimization, where full functionality is required. However, a large number of maintenance operations require only the detection of a fault location, and not the calculation of other sources of attenuation.

The high cost of OTDR's, their use as dedicated fault locators, and the high skill level required to accurately determining a fault location, has led to the development and manufacture of optical fault locators. Optical fault locators offer a lower cost alternative to OTDR's by providing only the fault location feature of an OTDR. A typical optical fault locator measures the distance to an optical fault by sending a light pulse through the fiber optic cable, measuring the time that passes between sending the pulse and receiving the reflected return pulse, and calculating the distance to the reflection point using the equation $d=(c/IOR)*(\Delta t/2)$; where d is the distance to the fault, c is the speed of light, IOR is the index of refraction, and $\Delta t$ is the time period between sending and receiving of the pulse. In most optical fault locators, the resulting distance value is then presented on a liquid crystal display, in units of feet or meters, for use by the operator.

Although typical optical fault locators provide a sufficient degree of accuracy for many applications, there have had a number of drawbacks that have limited their popularity. First, typical optical fault locators have a single pre-programmed index of refraction, while different fiber optic cables will have different indices of refraction. Therefore, in order to determine the fault distance for a particular cable, the value given by a typical locator must be multiplied by an IOR factor that will correct the distance based upon the actual IOR of the cable being tested. Second, because different types of faults will cause different degrees of reflection, typical optical fault locators include a means for manually adjusting the sensitivity of the locator in order to find a known fault. Unfortunately, this manual adjustment requires a high degree of experience on the part of the user in order to find the desired fault and to avoid false fault readings. Third, some optical fault locators only provide results in either feet or meters, as the calculations required to provide a dual display are not easily performed by the circuitry commonly used in these locators. Although, some locators accommodate both feet and meters through use of dual oscillators, the use of these oscillators tends to increase the cost and weight and size of the unit. Fourth, most optical fault locators use reflection amplitude to differentiate between various fiber reflection events in the cable under test, requiring expensive analog laser power controls and expensive laser light detector threshold setting controls to provide suitable differentiation between reflection events. Finally, current optical fault locators are operated at high frequency and produce significant levels of electromagnetic interference (EMI). This EMI must be shielded to avoid errors within the locators and to meet FCC interference requirements.

Therefore, there is a need for an optical fault locator that has a significantly lower cost than typical OTDR's, that calculates distance to a fault within an acceptable degree of accuracy, that allows the index of refraction to be varied by the user, that does not require user adjustment of the sensitivity of the unit in order to find a fault, that provides a display in feet or meters without the use of separate oscillators, does not require the use of expensive analog laser controls to differentiate between reflection events, and does not produce significant amounts of EMI.

SUMMARY OF THE INVENTION

The present invention is a hand held optical fault locator used to determine the distance to a discontinuity in a fiber optic cable. A discontinuity may be a fault, such as a break, nick, cut, scrape, indentation, or the like, a splice, a connector, or the end of the cable. The preferred optical fault locator includes an analog front end, a complex programmable logic device (CPLD), a laser diode and drive, a microcontroller, at least one input, and at least one output.

In operation, the user will input information through the input into the microcontroller, which sends a signal to the laser drive and diode to launch a pulse of laser light into the fiber optic cable. Once the pulse of laser light reaches a fault, such as a break, nick, cut, scrape, indentation, splice, connector, or the end of the cable, a portion of the light is reflected back through the cable and into the analog front end. The analog front end receives the reflected light generates an electrical signal corresponding to the intensity of the reflected light, amplifies this signal, and compares the amplified signal to a threshold value provided by the microcontroller. If the signal exceeds the threshold value, a digital pulse is sent to the microcontroller through the CPLD informing the microcontroller of time period between firing and reception. The time period is recorded and stored for later use by the microcontroller to determine the distance to the fault. The optical fault locator repeats this process for a predetermined number of pulses with the time periods between each being stored by the microcontroller. Once all of the pulses have been launched and light received, the microcontroller integrates them into the overall length count value, in accordance with a preprogrammed algorithm, to calculate the distance to the fault.

The preferred optical fault locator has a number of features that overcome drawbacks of prior art OTDR's and optical fault locators. First, the preferred optical fault locator has a user adjustable IOR feature that allows the IOR to be selected by the operator. This feature makes use of a programmable oscillator to adjust for different user-input IOR values. Once inputted by the user, a microcontroller references a look-up table corresponding to the selected units of measure and matches a frequency of oscillation corresponding to the selected IOR and selected units. The programmable oscillator then sends a counting signal in which one count is equal to one of the desired units of measure; i.e. one foot or one meter.

Second, the use of a programmable oscillator allows measurements to be taken directly in either feet or meters, eliminating the need for dual oscillators or complex divide chain circuits to provide the desired output in feet or meters.

Third, the preferred optical fault locator determines the time to a reflective event using a low-frequency integrating technique in which the base clock is ½s slower than a 1:1 clocking scheme. This permits high accuracy fiber lengths to be measured at counting frequencies in the 4 MHz range, eliminating the need for high frequency, EMI producing, circuitry.

Fourth, the preferred optical fault locator eliminates the need for expensive laser power control circuitry by determining fiber reflection events in the digital-time domain. Rather than continuously pinging, as is the case with common OTDR's and optical fault locators, the optical fault locator of the present invention sends a series of bursts and stops. This conserves power, allowing the laser to be launched at full power without the undesirable battery drain caused by continuous pinging.

Fifth, the preferred optical fault locator operates a trans-impedance amplifier at maximum saturating gain, allowing fiber reflection events to be determined by counting them digitally. This eliminates the need for a sensitivity adjustment feature and for expensive analog variable gain control circuitry.

Finally, in some alternative embodiments of the invention where the trans-impedance amplifier is not operated at maximum saturation gain, a threshold control algorithm is utilized to eliminate the need for a sensitivity adjustment feature.

Therefore, it is an aspect of the invention to provide an optical fault locator that has a significantly lower cost than typical OTDR's.

It is a further aspect of the invention to provide an optical fault locator that calculates distance to a fault within an acceptable degree of accuracy.

It is a further aspect of the invention to provide an optical fault locator that allows the index of refraction to be varied by the user.

It is a further aspect of the invention to provide an optical fault locator that does not require manual adjustment of the sensitivity of the unit in order to find a fault.

It is a further aspect of the invention to provide an optical fault locator that utilizes an averaging technique to eliminate noise.

It is a further aspect of the invention to provide an optical fault locator that provides a display in feet or meters without the use of separate oscillators.

These aspects of the invention are not meant to be exclusive and other features aspects, and advantages of the present invention will be readily apparent to those of ordinary skill in the art when read in conjunction with the following description, appended claims and accompanying drawings.

DETAILED DESCRIPTION OF THE INVENTION

Figure 1:
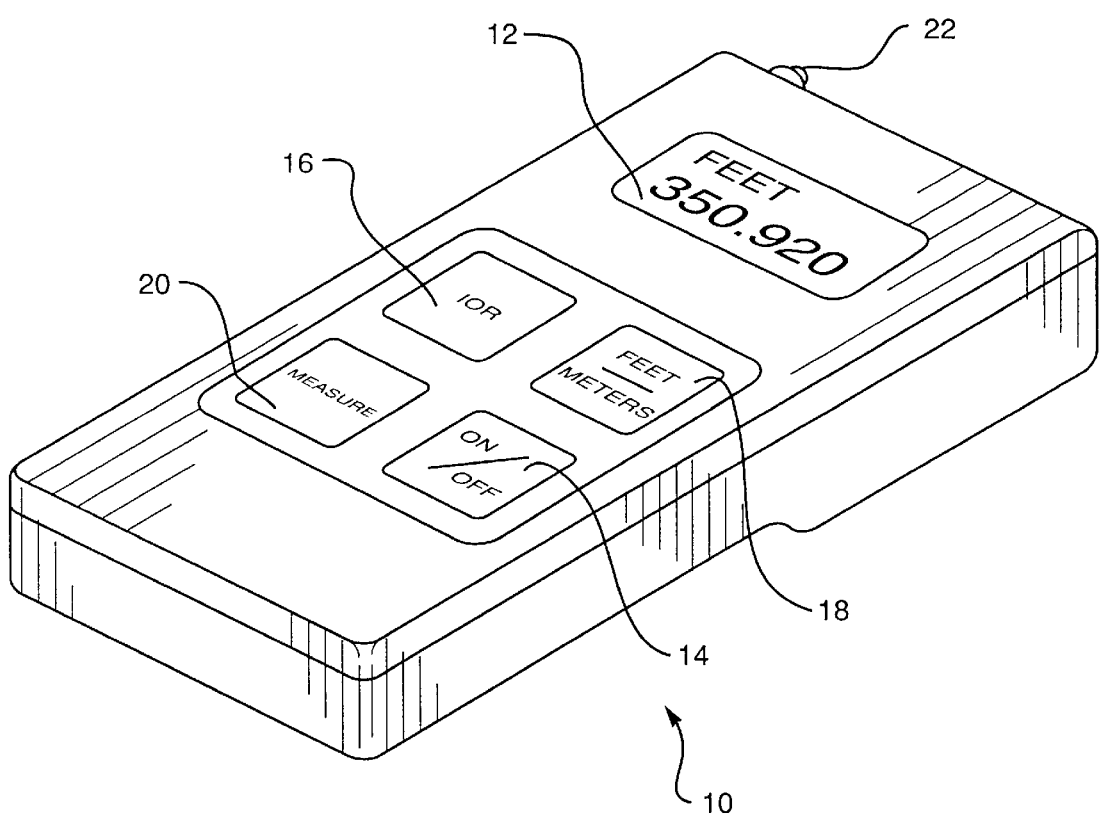
FIG. 1 is an isometric view of one embodiment of the optical fault locator of the present invention.

Referring first to FIG. 1, an isometric view of one embodiment of the optical fault locator 10 of the present invention is shown. The optical fault locator 10 is preferably a hand held instrument having an electronic display 12 and a plurality of inputs 14, 16, 18, 20 for providing instructions to the locator 10. Although other types of electronic displays 10 may be utilized, the preferred display 12 is a liquid crystal display capable of displaying up to six characters, five decimal places, and predetermined status information such as units of measurement, laser status, low battery status and the like.

In the embodiment of FIG. 1, the inputs 14–20 are membrane type buttons as are commonly utilized in devices of this type. These inputs 14–20 include an on/off button 14, an index of refraction (hereafter IOR) adjustment button 16 for selecting an IOR corresponding to the IOR of the cable to be tested, a feet/meters selection button 18 for selecting the desired units for display of the distance to the fault within the cable, and a measure button 20 for activating the laser so that measurements may be taken. However, in other embodiments, additional manual inputs may be added. Similarly, it is recognized that different types of commonly utilized manual data inputs may be Substituted for the membrane type buttons, or data may be input from a computer through an RS232 or infrared communication link, to achieve similar results.

Figure 2:
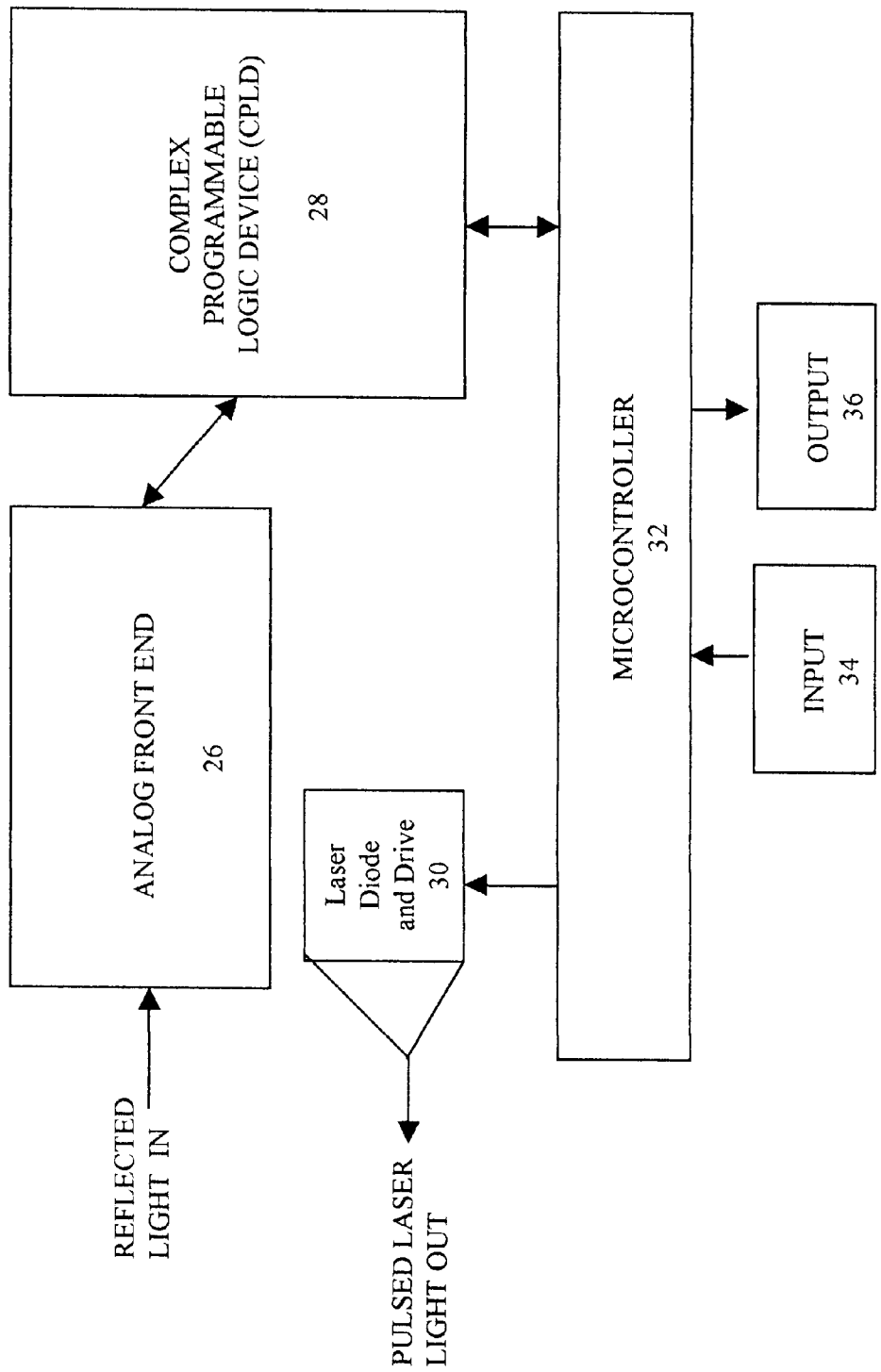
FIG. 2 is a block diagram showing the relationships between the hardware of one embodiment of the optical fault locator of the present invention.

Referring now to FIG. 2, a block diagram showing the relationships between the hardware of the optical fault locator 10 of the present invention is shown. The hardware is preferably housed on a single circuit board and includes an analog "front end" 26, a complex programmable logic device (hereafter CPLD) 28, a laser drive and diode 30, a microcontroller 32, and an input 34 and an output 36.

In operation, the user will check the IOR setting and input any necessary changes to this setting, input the desired measurement units, and input an instruction to begin the test, through the input 34 into the microcontroller 32. The microcontroller 32 then sends a signal to the laser drive and diode 30 to launch a pulse of laser light into the fiber optic cable. Simultaneously, the microcontroller 32 sends a threshold signal through the CPLD 28 to the analog front end 26 to set a threshold for the recognition of a fault or other reflective event. Once the pulse of laser light reaches the event, such as a break, nick, cut, scrape, indentation, splice, connector, or the end of the cable, a portion of the light is reflected back through the cable and into the analog front end 26. As discussed in greater detail below, the analog front end 26 receives the reflected light, generates an electrical signal corresponding to the intensity of the reflected light, amplifies this signal, and compares the amplified signal to the threshold value provided by the microcontroller 32 If the signal exceeds the threshold value, a digital pulse is sent to the microcontroller 32 through the CPLD 28 informing the microcontroller 32 of the time period between the firing of the pulse and the reception of the reflected light. This time period is recorded and stored for later use by the microcontroller 32 to determine the distance to the fault.

The optical fault locator 10 then repeats this process for a predetermined number of pulses, preferably 800, with the time periods between each being stored by the microcontroller 32. Once all of the pulses have been launched and light received, the microcontroller 32 integrates them into the overall length count value, in accordance with a preprogrammed algorithm, to calculate the distance to the fault. This permits high accuracy fiber lengths to be measured at counting frequencies in the 4 MHz range, eliminating the need for high frequency, EMI producing, circuitry.

Once the distance to a specific fault, sometimes referred to as a reflective event, is located, this distance is stored and a new set of 800 pulse time values is inputted, processed and stored for the next reflective event within the optical cable. The microcontroller 32 programs the event detector to respond to up to 8 separate events. The counting logic's input clock is gated for the duration of the event to be found. The microcontroller 32 may read-back the total number of events found after every pulse of the laser. Thus, the locator of the present invention is able to detect and display to the user numerous reflection events on a single fiber cable. In the preferred optical fault locator 10, this process may be performed up to eight times, allowing the storage and display of up to eight events and illuminating a multiple event enunciator. The output of the number of events occurring in the cable is performed digitally under microcontroller control allowing the distance to each of these multiple events to be displayed on the electronic display by momentarily depressing the measure button to scroll to each specific event.

Figure 3:
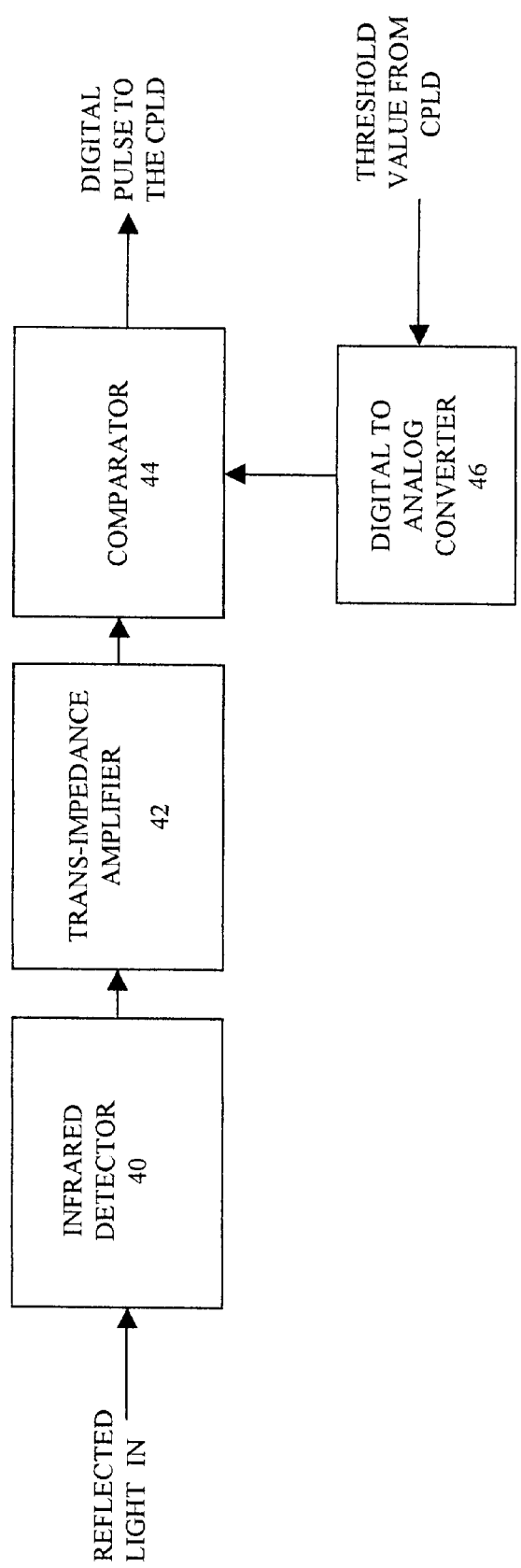
FIG. 3 is a block diagram of the analog front end of one embodiment of the optical fault locator of the present invention.

Referring now to FIG. 3, a detailed block diagram of the preferred front end 26 is shown. Front end 26 includes an infrared detector 40 for receiving the reflected light and turning that light into a current proportional to the intensity of the light received. A direct-coupled trans-impedance amplifier 42 is in electrical communication with the infrared detector 40. The trans-impedance amplifier 42 converts the current input from the diode detector and outputs a saturated voltage output. In the preferred embodiment, trans-impedance amplifier 42 presents a 30× gain and sends the signal through a pair of operational amplifiers (not shown) to increase the gain to 30,000× the original, essentially saturating the voltage output to provide a nearly square waveform. A comparator 44 receives a threshold value from the CPLD through a digital to analog converter 46, receives and analyzes the signal from the amplifier 42, and sends a digital pulse to the CPLD when the signal exceeds the received threshold value.

The preferred optical fault locator 10 eliminates the need for expensive laser power control circuitry by determining fiber reflection events in the digital-time domain. Rather than continuously pinging, as is the case with common OTDR's and optical fault locators, the optical fault locator 10 of the present invention sends a series of bursts and stops. This conserves power, allowing the laser to be launched at full power without undesirable battery drain caused by continuous pinging. As noted above, the locator 10 operates the trans-impedance amplifier 42 at maximum saturating gain eliminating expensive analog variable gain control circuitry and allowing fiber reflection events to be determined by counting them digitally.

The saturation gain feature of the preferred optical fault locator 10, discussed above, allows the threshold detection value to be fixed. However in other embodiments, the signal from the trans-impedance amplifier 42 may not be saturated, under certain circumstances, and a variable threshold technique is implemented to determine the location of an event. This variable threshold technique is performed by a digital to analog converter under processor control. In these embodiments the microcontroller 32 determines that the comparator 44 has not identified a reflective event within a predetermined period of time and executes a threshold control algorithm that incrementally reduces the threshold value utilized by the comparator 44 until the reflective event is identified. This threshold control algorithm utilizes an averaging technique to eliminate false readings caused by noise or backscattering of the laser light.

Figure 4:
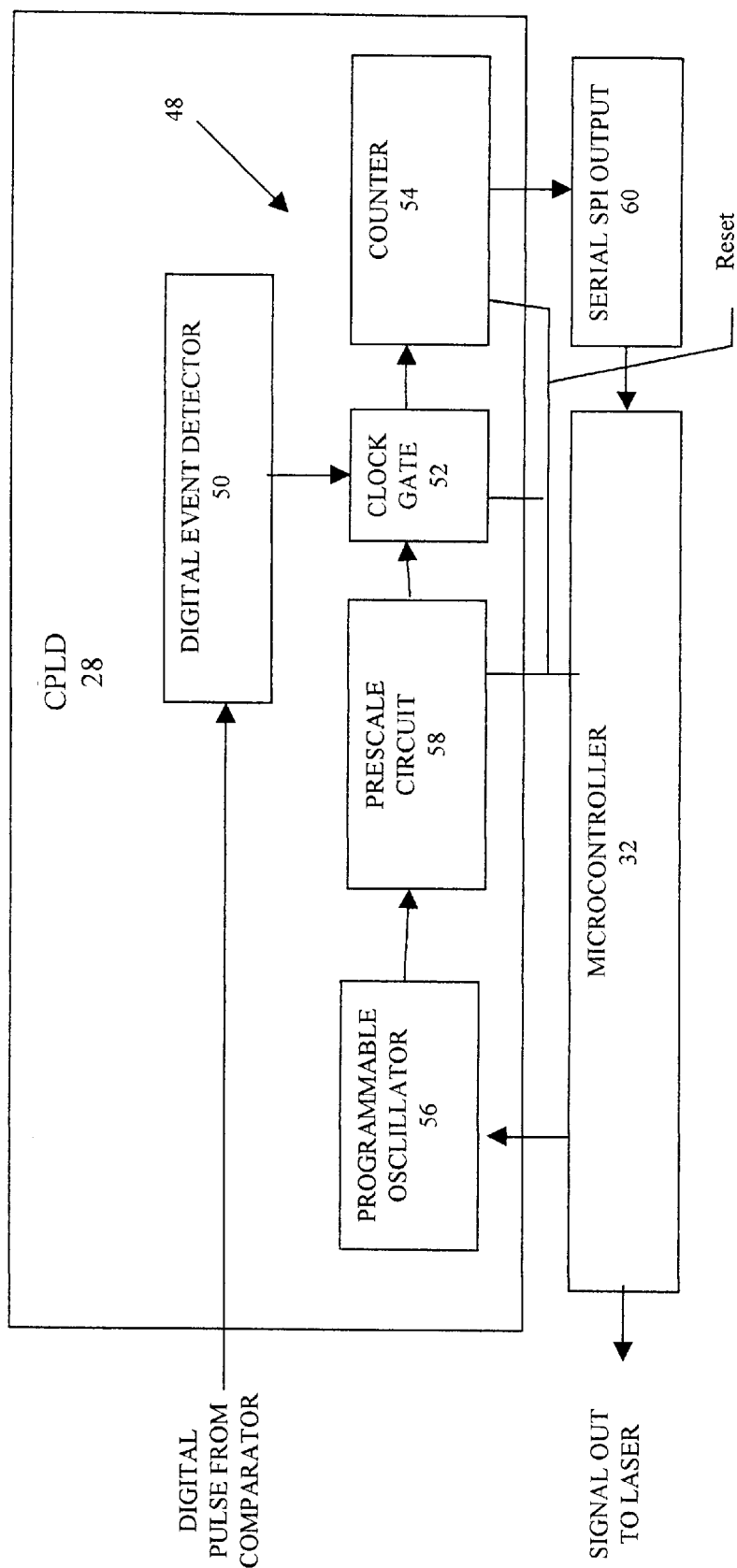
FIG. 4 is a block diagram of the hardware utilized to make the distance calculation in the preferred embodiment of the optical fault locator of the present invention.

Referring now to FIG. 4, a block diagram of the hardware utilized to make the distance calculation is shown. The preferred distance calculation determines the fiber optic cable length using a low-frequency integrating technique in which the base clock is $\frac{1}{25}$ slower than a 1:1 clocking scheme and is performed through the interaction of a counting circuit 48 and the microcontroller 32. In the preferred optical fault locator 10, the entire counting circuit 48 is contained within the CPLD 28 and includes a digital event detector 50, a clock gate 52, a counter 54, a programmable oscillator 56 and a prescale circuit 58.

In operation, the microcontroller 32 will send a signal to the programmable oscillator 56 causing it to oscillate at a predetermined frequency, corresponding to the user input IOR and unit of measure. The microcontroller 32 then sends a signal to the laser to launch a laser light pulse and, simultaneously, sends another signal to open the clock gate 52 and reset the counter 54. Once the clock gate 52 is opened, the signals from the programmable oscillator 56 pass through the prescale circuit 58, the clock gate 52 and into the counter 54. The prescale circuit 58 preferably prescale the signal in two stages, first by four and then by eight to yield a sixteen bit length. The counter 54 then accepts the prescaled signal from the oscillator 56 and counts the number of oscillations that pass through the clock gate 52. Once a digital pulse is received from the front end 26 indicating that a reflective event has occurred, the digital event detector 50 sends a signal to close the clock gate 52, effectively stopping the transmission of the prescaled signal from the oscillator 56 to the counter 54. The counter 54 then recognizes the loss of this signal and sends an output signal corresponding to the number of oscillations counted, to the microcontroller 32. In the preferred embodiment, this signal is sent through a serial SPI output 60 to the microcontroller 32. However, it is recognized that this signal could also be sent through a parallel port, or other input means, to achieve similar results. Once the count signal is received, the microcontroller 32 stores this value into memory and repeats this process until all 800 pulses are launched and all reflective events have been counted.

The preferred optical fault locator 10 has a selectable Index of Refraction (IOR) feature that allows the IOR to be selected by the operator. This feature makes use of the programmable oscillator 56 to adjust for different user-input IOR values. These IOR values are preferably between 1.40 to 1.69 and are selectable in increments of 0.01. Once inputted by the user, the microcontroller 32 references a look-up table corresponding to the selected units of measure and matches a frequency of oscillation corresponding to the selected IOR and selected units. As noted above the microcontroller 32 then sends a signal to the CPLD 26 corresponding to the appropriate frequency level, and the CPLD 26 adjusts the frequency output of the programmable oscillator 56 in order to provide an accurate distance measurement for the type of fiber in use and the desired units. In the preferred embodiment, the CPLD 26 controls the programmable oscillator by sending a set of characters to the oscillator 56 which, in turn, adjusts the output frequency based upon this character. However, it is understood that different means of controlling the programmable oscillator, such as commonly employed voltage control techniques, may be utilized to achieve similar results.

The use of a programmable oscillator 56 has two principal benefits. First, it allows the frequency to be adjusted such that one oscillation corresponds to one foot or meter. This eliminates the need for complex divide chain circuits and allows a simple frequency counter to determine the length to an event by taking the number of counts corresponding to the number of meters or feet. Second, the programmable oscillator 56 allows measurements to be taken directly in either feet or meters. This eliminates the need for dual oscillators and, again, eliminating the need for complex divide chain circuits to provide the desired output.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An optical fault locator for locating reflective events within a fiber optic cable, said optical fault locator comprising:

at least one user input for accepting information from a user;

a laser assembly for sending a pulsed laser light through the fiber optic cable;

a front end for receiving a reflected portion of the pulsed laser light from the fiber optic cable, comparing, a value of the reflected portion of the pulsed laser light with a threshold value, and outputting a digital pulse corresponding to a result of the comparison;

a complex programmable logic device in communication with the front end for sending the threshold value to the front end accepting the digital pulse from the front end, and sending at least one output corresponding to a distance to a reflective event;

a microcontroller in communication with said user input, said laser assembly, and said complex programmable logic device, said microcontroller being programmed to accept said information from said user input, calculate the threshold value, simultaneously send a threshold signal, corresponding, to the threshold value, to said complex programmable logic device and a laser signal, corresponding to the threshold value, to said laser assembly to launch a laser pulse, receive said at least one output corresponding to a distance to a reflective event from said complex programmable logic device, calculate an actual distance based upon said at least one signal, and send a distance output signal; and at least one user output for accepting said distance output signal from said microcontroller and providing a corresponding distance value to the user.

2. The optical fault locator as claimed in claim 1, wherein said information from the user comprises an index of refraction of the fiber optic cable, wherein said complex programmable logic device comprises a counting circuit having a programmable oscillator for varying a counting frequency, and wherein said microcontroller is further programmed accept said index of refraction and to send a control signal, corresponding to said index of refraction, to said programmable oscillator.

3. The optical fault locator as claimed in claim 2 wherein said information further comprises a unit of measure, wherein said microcontroller is further programmed to reference a look up table corresponding to said unit of measure and said index of refraction and to send a control signal to said programmable oscillator, said control signal corresponding to said unit of measure and said index of refraction.

4. The optical fault locator as claimed in claim 3 wherein said unit of measure is chosen from a group consisting of meters and feet, and wherein said control signal causes said counting frequency of said programmable oscillator to be varied such that one oscillation corresponds to one unit of said chosen units of measure.

5. The optical fault locator as claimed in claim 1, wherein said complex programmable logic device comprises a counting circuit comprising:

a digital event detector;

a clock gate in communication with said digital event detector and said microcontroller:

a programmable oscillator for varying a counting frequency;

a prescale circuit in communication with said programmable oscillator and said clock gate; and a counter in communication with said clock gate and said microcontroller;

wherein said microcontroller sends a control signal to said programmable oscillator and simultaneously sends an opening signal to open the clock gate, said programmable oscillator sends a counting signal through said prescale circuit and said clock gate to said counter and said counter receives and counts a number of prescaled counting signal oscillations until said digital event detector sends a closing signal to close said clock gate and sends a count output signal to said microcontroller once said clock gate is closed.

6. The optical fault locator as claimed in claim 5 wherein said prescale circuit prescales said counting signal in two stages such that said prescaled counting signal has a sixteen bit length.

7. The optical fault locator as claimed in claim 5 wherein said microcontroller is further programmed to receive a plurality of count output signals from said counter and to calculate and store a distance to said reflective event based upon said plurality of count output signals.

8. The optical fault locator as claimed in claim 7 wherein said microcontroller is further programmed to calculate and store distances to up to eight reflective events.

9. The optical fault locator as claimed in claim 1 wherein said analog front end comprises:
- an infrared detector for detecting the reflected portion of the pulsed laser light from the fiber optic cable and providing a current output corresponding to said detected light;
- a trans-impedance amplifier for receiving the current output from the infrared detector and outputting a voltage output signal;
- a digital to analog converter for accepting a digital representation of the threshold value from the complex programmable logic device and converting said digital representation to an analog threshold signal; and
- a comparator for accepting said voltage output signal from said trans-impedance amplifier, receiving said analog threshold signal from said digital to analog converter, comparing said voltage output signal to said analog threshold signal, and sending a digital pulse to said complex programmable logic device when said voltage output signal exceeds said analog threshold signal.

10. The optical fault locator as claimed in claim 9 wherein said trans-impedance amplifier outputs a saturated voltage output signal.

11. The optical fault locator as claimed in claim 9 wherein said trans-impedance amplifier outputs an unsaturated voltage output signal and wherein said microcontroller is programmed to vary the threshold value until a reflective event is located.

12. The optical fault locator as claimed in claim 1 wherein said at least one input comprises at least one membrane type button, and wherein said at least one output comprises a liquid crystal display.

13. The optical fault locator as claimed in claim 1 wherein one of said at least one input is chosen from a group consisting of an RS232 communication link and an infrared communication link.

14. The optical fault locator as claimed in claim 1 further comprising a circuit board upon which said laser assembly, said front end, said complex programmable logic device, and said microcontroller are disposed.

15. A method of detecting a reflective event in a fiber optic cable comprising the steps of:
(a) inputting an index of refraction into a microcontroller;
(b) instructing said microcontroller to begin a test;
(c) launching a pulse of laser light into the fiber optic cable;
(d) opening a clock gate simultaneously with said launching step;
(e) causing a programmable oscillator to oscillate at a predetermined frequency based upon said index of refraction;
(f) counting a number of oscillations passing through said clock gate;
(g) receiving a reflected portion of the pulse of laser light from the fiber optic cable;
(h) comparing a value of the reflected portion of the pulsed laser light with a threshold value;
(i) closing the clock gate when the reflected portion of the pulsed laser light exceeds the threshold value;
(j) summing the number of oscillations counted between the opening of the clock gate and the closing of the clock gate;
(k) repeating steps (c) through (j) a predetermined number of times; and
(l) calculating a distance to the reflective event based upon the results of the summing steps.

16. The method as claimed in claim 15 further comprising the step of inputting a unit of measure into a microcontroller prior to said step of instructing said microcontroller to begin a test, and wherein the step of causing a programmable oscillator to oscillate at a predetermined frequency comprises the step of causing said programmable oscillator to oscillate at a predetermined frequency of oscillation corresponding to said unit of measure and said index of refraction.

17. The method as claimed in claim 16 wherein said predetermined frequency of oscillation is such that one oscillation corresponds to one of said unit of measure.

18. The method as claimed in claim 15 further comprising the steps of determining that a reflective event has not been detected and altering the threshold value until the reflective event is detected.

19. The method as claimed in claim 15 wherein steps (c) through (l) are repeated up to eight times and wherein said method further comprises the step of storing a result of each calculating step.

20. The method as claimed in claim 15 further comprising the step of sending an output corresponding to the distance.

* * * * *